(12) United States Patent
Ichikawa

(10) Patent No.: US 7,773,854 B2
(45) Date of Patent: Aug. 10, 2010

(54) PLAYER, AND SOURCE SWITCHING METHOD FOR RECORDING AND PLAYBACK APPARATUS

(75) Inventor: Tetsuya Ichikawa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1488 days.

(21) Appl. No.: 10/864,298

(22) Filed: Jun. 9, 2004

(65) Prior Publication Data

US 2005/0018999 A1 Jan. 27, 2005

(30) Foreign Application Priority Data

Jun. 16, 2003 (JP) ............................. 2003-170343

(51) Int. Cl.
*H04N 5/91* (2006.01)
*H04N 5/00* (2006.01)
*H04N 5/76* (2006.01)
*H04N 7/00* (2006.01)
*G10H 7/00* (2006.01)

(52) U.S. Cl. .............................. 386/46; 386/94; 386/95; 386/98; 386/117; 386/125; 348/231.1; 84/601; 84/645

(58) Field of Classification Search .................. 386/46, 386/94, 95, 98, 117, 125, E5.002, E5.042, 386/E5.07, E9.009, E9.012, E9.013; 348/231.1, 348/E5.108, E7.061; 375/E7.019; 84/601, 84/645; G09B 20/009, 21/02, 27/012, 27/019, G09B 27/05, 27/051, 27/052, 7/005, 19/001, G09B 20/002, 27/001, 27/021

See application file for complete search history.

(56) References Cited

U.S. PATENT DOCUMENTS

| 5,679,911 A | * | 10/1997 | Moriyama et al. ............. 84/601 |
| 6,628,591 B1 | | 9/2003 | Yokota et al. |
| 6,931,198 B1 | * | 8/2005 | Hamada et al. ............... 386/46 |
| 2002/0018643 A1 | * | 2/2002 | Okada et al. .................. 386/95 |
| 2003/0058352 A1 | * | 3/2003 | Nishijima et al. ......... 348/231.1 |

FOREIGN PATENT DOCUMENTS

| JP | 3-004983 | 2/1991 |
| JP | 05036192 | 2/1993 |
| JP | 10-241344 | 9/1998 |
| JP | 2000-268481 | 9/2000 |
| JP | 07-036470 | 2/2001 |
| JP | 2001-245228 | 9/2001 |
| JP | 2002-245709 | 8/2002 |

* cited by examiner

*Primary Examiner*—Thai Tran
*Assistant Examiner*—Syed Y Hasan
(74) *Attorney, Agent, or Firm*—Brinks Hofer Gilson & Lione

(57) ABSTRACT

In a player, for example, when a memory card is loaded as a removable medium during playback of a CD, an audio-output-source selecting unit switches the output state to playback of the memory card in normal operation. However, in a case in which a medium-loading detecting unit detects that a memory card is not loaded at the time when a request for recording on the memory card is entered during the playback of a CD, and a medium-loading-time detecting unit detects that the memory card is loaded within a predetermined time, the audio-output-source selecting unit immediately starts recording on the memory card without switching the output state to the playback of the memory card.

19 Claims, 8 Drawing Sheets

PLAYER, AND SOURCE SWITCHING METHOD FOR RECORDING AND PLAYBACK APPARATUS

BACKGROUND OF THE INVENTION

1. Field of the Invention

The present invention relates to players such as audio players that produce audio output, televisions, and video players that produce video output. More particularly, the present invention relates to a player in which audio recording or video recording can be performed even when a recording medium is loaded after the audio recording or the video recording is requested.

2. Description of the Related Art

With recent progress in audio technology, audio players have adopted various types of audio sources, that is, not only audio sources that have hitherto been widely used, such as radio receivers, CD players, MD players, and cassette players, but also players that play back CD-Rs or CD-RWs on which audio data is recorded in a compressed form by MP3, memory card players that play back memory cards each having a memory chip in which similar audio data is recorded, DAT players, and DVD audio players.

While such audio sources including a radio receiver are sometimes used as separate players, a majority of audio players are used as players equipped with multiple sources in which an arbitrary source can be selected and the number of medium drivers and audio circuits is minimized.

In particular, in car-mounted audio players, consideration is often required in order to arrange as many types of audio sources as possible within a limited space. For that purpose, recent car-mounted audio players can play media, such as MDLPs on which a large amount of audio data can be recorded in a compressed manner and CD-Rs on which audio data is recorded in a compressed manner particularly by MP3. Users create media using a player or a personal computer installed at home, and play back the media on a car-mounted audio player in the car. In particular, memory cards each having a memory chip installed therein have recently increased in capacity. Since such a memory card can be loaded in quite a small space in the audio player, it is attracting attention as a medium that is particularly suitable for use in car-mounted audio players.

In an audio player, such as a car-mounted audio player, which produces audio output by appropriately combining these audio sources, the user can selectively operate an arbitrary audio source, for example, using selection switches provided on the front surface of the audio player or selection switches provided on a remote control.

The above-described audio sources can use many media which are not only simply played back, but also on which the user can arbitrarily record data. For example, cassette tape players and MD players can directly record audio data. Players that thus directly record data have also been proposed which can record data on CD-Rs, CD-RWs, and memory cards. In this case, one audio apparatus includes a plurality of recording sources, and can record data on a medium corresponding to an arbitrary source.

The above-described audio sources are roughly classified into audio sources, such as radio receivers and hard disks, that are directly built into an audio player, and audio sources in which audio data recording media, such as CDs, MDs, and memory cards, are removably loaded. Some of the audio sources are capable of recording and use removable media.

When the user loads a medium for one removable-media audio source into an audio player, it is determined by the audio player that the user wants to play back audio data recorded on the loaded medium, and the audio source corresponding to the medium is automatically put into a state of readiness to play back the medium, or is made to actually perform a playback operation.

In an audio player disclosed in Japanese Unexamined Patent Application Publication No. 5-36192, when playback of a removable medium is stopped, the playback stop position is stored in a nonvolatile memory. When the same medium is played back again later, the stored playback stop position is read out so that playback can be started from the position at which the previous playback operation was stopped.

On the other hand, with recent progress in audiovisual technology, not only television receivers and cassette video decks that have hitherto been used, but also DVD players that play back commercially available DVDs, and players for DVD-Rs, DVD-RWs, DVD+Rs, DVD+RWs, and DVD-RAMs that record data from television programs on DVD disks and play back the recorded data, have come into use. Furthermore, television programs and so on are recorded on hard disks. Many users record digital video pictures of their own design on a hard disk and view the pictures, or record edited digital video pictures on various kinds of writable DVDs, and view the pictures.

In particular, hard disks have been installed in various apparatuses, including the above-described audio apparatuses, as a result of size and price reduction and an increase in capacity. Hard disks are also used in audio apparatuses including navigation systems in cars, and can be used for video recording. Furthermore, memory cards have recently increased in capacity, and some of them provide a memory capacity of several gigabytes. Television pictures are sometimes recorded on such a memory card, and are played back by a video player that is capable of reading memory cards.

Since such a memory card is quite compact, a player can be easily installed in a car-mounted audiovisual apparatus. In particular, since terrestrial digital television receivers that can receive clear pictures, and navigation systems equipped with such a television receiving function have been widely applied, the users can view many television programs on a monitor screen. In this case, the users can record desired pictures in a preloaded memory card while watching the television so that they can view the pictures again later. The memory card can be removable so that the recorded pictures can be viewed on different players. These operations can also be performed in home audiovisual apparatuses.

As described above, audio players and video players use various types of removable-media sources, and an increasing number of removable-media sources are capable of audio and video recording. In a player having such a function of operating a removable-media source capable of audio and video recording, for example, while the user is listening to a favorite song on the radio, the song can be immediately recorded by pressing a recording button. In particular, since a medium such as a memory card is easily handled and recording thereon can be performed the moment audio recording is requested, it is expected to be widely used in the future.

The above-described memory card allows audio data to be read and written at high speed, and does not cause data deterioration during recording. Therefore, it is easy to select a desired musical piece from musical pieces recorded on, for example, a CD or a CD-R, to copy the piece onto a memory card, and to listen to the musical piece from the memory card.

In this way, in a case in which the user wants to immediately record a musical piece, which is to be played, on a memory card or the like while listening to a radio program on an audio player, or in a case in which the user wants to copy a specific musical piece onto a memory card during playback of a CD or a CD-R or during a playback standby state, if a memory card is not loaded through an insertion slot at the time at which a recording request is entered, a prompt for loading of a memory card is displayed on a screen or is generated as a warning sound, and the player is placed in a standby state until the user loads a memory card.

In conventional players, in a case in which the user then inserts a memory card through the slot, that is, in a case in which a medium is loaded in a removable-media source, it is determined that the user wants to play back audio data recorded on the medium, and the output source is switched to the removable-media source even when, for example, the radio is producing output, as described above. Similarly, when a request is entered to copy a specific musical piece onto a memory card in a state in which the audio player is, for example, in a CD playback state, and when a memory card is not loaded, the audio player is automatically switched to a memory-card output state in response to loading of a memory card.

For this reason, even when the user immediately inserts a memory card in the slot to record a musical piece generated from the radio, as described above, the player is switched to a memory-card output state. Therefore, in order to start recording, the user must switch the audio player to a radio output state again and then enter a recording start request. At the time when recording is started, the musical piece that the user wants to record has been played partway, and is not completely recorded. This also applies to a case in which a musical piece recorded on a CD is copied onto a memory card. After the player is automatically placed into a memory-card output state by the insertion of a memory card into the slot, the user must return the player to a CD playback state, and then start recording again. These operations are troublesome.

This also applies not only to a case in which recording on a memory card is performed in the audio player, but also to a case in which a cassette tape is not loaded before recording operation, a case in which the player is capable of recording on a CD-R and a CD-RW, and a case in which data is recorded in audio sources using other removable media.

The above problem also arises in a video player that produces video output. For example, in a case in which a DVD-R is not loaded when the user wants to immediately record while watching the television by means of a DVD-R or a DVD-RW video tuner, the user loads a DVD-R according to a prompt for loading displayed on the screen. In this case, the player is set to a DVD-R output state by the above-described preset operation. For this reason, the user must switch the player state to a television output state again, and give directions to perform recording. A similar problem also arises when a recording medium is not loaded in a removable-media source at the time when a recording request is entered, as in the above-described high-capacity memory cards that are expected to become popular in the future.

In some players, in a case in which recording is performed using a removable-media source, for example, in a case in which the user requests recording on a cassette tape while listening to the radio, even when a cassette tape is loaded after the request, the output state is not switched to a cassette-tape output state. Similarly, in a video tape recorder equipped with a television receiver, in a case in which a video tape is loaded after the user requests recording on a video tape while watching the television, output from the radio or the television is continued without switching the recorder to a video-tape output state.

However, in such players, the user must perform an audio or visual recording start operation after a cassette tape or a video tape is loaded, and this is troublesome. In such players, originally, output from or recording on a cassette tape can be performed only by performing a playback or recording start operation after a cassette tape is loaded while listening to the radio. Similarly, even when the user loads a video tape while watching a television program by means of a video tape recorder, there is a need to perform a playback or recording start operation to carry out playback and recording.

SUMMARY OF THE INVENTION

Accordingly, an object of the present invention is to provide a player that automatically switches an output source to a removable-media source when a medium is loaded in the removable-media source in a state in which the player is in an output state for a specific source, wherein audio or visual recording can be started immediately after loading of the medium in a case in which the medium is not loaded at the time when audio or visual recording by the removable-media source is requested in a state in which the player is in the output state for the specific source.

In order to overcome the above problem, according to an aspect, the present invention provides a player including a plurality of sources, at least one of the sources being a removable-media source capable of audio or video recording on a removable medium, an output-source selecting unit for selecting one of the sources, and a medium-loading detecting unit for detecting whether the removable medium is loaded in the removable-media source. The output-source selecting unit includes an output-source switching unit that switches an output source to the removable-media source when the medium-loading detecting unit detects that the removable medium is loaded during an output state for the selected source, and imposes a switching restriction so as not to switch the output source to the removable-media source when the medium-loading detecting unit detects that the removable medium is not loaded at the time when a recording request for audio or video recording on the removable medium is entered during the output state for the selected source, even when the loading of the removable medium is detected later.

During normal operation, when the medium-loading detecting unit detects that the removable medium is loaded during an output state for one selected source, the output source is switched from the selected source to the removable-media source. In contrast, in a case in which the medium-loading detecting unit detects that the removable medium is not loaded at the time when a request for audio or video recording on the removable media is entered during the output state for the selected source, even when the medium-loading detecting unit detects the loading of the medium later, the output source is not switched to the removable-media source.

In the conventional art, as described above, while the output state is immediately switched to a playback state for a memory card when the memory card is loaded while a CD is being played back, in a case in which a memory card is loaded in a slot after a request for recording on the memory card is entered during the playback of the CD, the output state is switched to a playback state for the memory card, and therefore, a recording start operation must be performed after the output state is switched again to the playback state for the CD. In contrast, in the player of the present invention, such a complicated operation is unnecessary, a standby state of recording from the CD onto the memory card can be maintained, and the number of operations can be reduced.

Preferably, the player further includes a medium-loading-time detecting unit for detecting the loading time of the removable medium, and the output-source switching unit imposes the switching restriction when the medium-loading-time detecting unit detects that the removable medium is loaded before a predetermined time elapses from the input of the recording request. For example, in a case in which a memory card is loaded after a request for recording on the memory card is entered during the playback of the CD, when the memory card is loaded after the predetermined time has elapsed from the time of the request, it is determined that the memory card is not loaded to record data on the CD onto the memory card, but it is loaded to be played back. Since the above-described switching restriction is not enforced for a long period, the usability of the player is increased.

Preferably, the player further includes a medium-loading-time detecting unit for detecting the loading time of the removable medium into the removable-media source, and the medium-loading-time detecting unit includes a medium-loading-time determining unit that cancels the recording request when the medium-loading-time detecting unit does not detect the loading of the removable medium before a predetermined time elapses from the time the recording request was entered. For example, in a case in which a memory card is not loaded in the slot before the predetermined time elapses from the input of the memory card during the playback of the CD, the recording request is cancelled, and the recording standby state is switched to a state in which the output from the previously used source is continued.

Preferably, when the medium-loading detecting unit detects the loading of the removable medium after the recording request is entered, the output from the source selected by the output-source selecting unit and audio or video recording on the removable medium are started. For example, in a case in which a memory card is loaded after the request for recording on the memory card is entered during the playback of the CD, the playback of the CD and recording on the memory card can be immediately started without requiring any user's operation after loading. This increases the usability of the player.

Preferably, when the medium-loading detecting unit detects the loading of the removable medium after the recording request, audio or video recording on the removable medium is started at the time when a request for output from the source selected by the output-state selecting unit is entered. For example, in a case in which a memory card is loaded after a request for recording on the memory card is loaded during the playback of a CD, the recording request can be enabled only after the user checks the state of the player, such as a CD playback position, after the loading of the memory card, and inputs a request for starting output, such as playback of the CD or recording. This prevents undesired recording. In such a case, the number of operations can be reduced, compared with a player in which the output state is switched to the playback of a memory card every time the memory card is loaded.

Preferably, when the medium-loading detecting unit detects that the removable medium is not loaded at the time when the recording request is entered, the output from the source selected by the output-source selecting unit is temporarily stopped. In the above case in which a memory card is not loaded in the slot at the time when a request for recording on the memory card is entered during the playback of a CD, the playback of the CD can be temporarily stopped until the memory card is loaded later. When the memory card is loaded, the user can start recording at a desired point.

Preferably, the player further includes a copyright-protection-state detecting unit for detecting a copyright protection state of audio or video recording when the recording request is entered, and the output-source switching unit does not impose the switching restriction when the copyright-protection-state detecting unit detects that the audio or video recording is disabled by copyright protection. Therefore, in the above case in which a request for recording on a memory card is entered during playback of a CD, the copyright-protection-state detecting units detects, for example, a restriction on the number of times of recording operations on the memory card. When it is determined that the recording is disabled by the restriction, the output state is switched to the playback of the memory card at the time of loading of the memory card, as in the normal operation. In this way, the user can be informed that the recording request is improper, by the operational state of the player.

Preferably, the copyright-protection-state detecting unit detects a copyright protection state of an output source and a copyright protection state of a recording source. For example, in the above case in which a request for recording on a memory card is entered during playback of a CD, both a copyright protection state of the CD such as a copyguard state, and a copyright protection state of the memory card, such as a restriction on the number of recording operations, are detected. When the recording is disabled by any of the copyright protection states, the output state is switched to the playback of the memory card at the time of loading of the memory card, as in the normal operation. In this way, the user can be more reliably guided by being informed that the recording request is improper, by the operational state of the player.

Preferably, the player further includes a recording-restriction detecting unit for detecting a restriction on audio or video recording on the removable medium, and the switching restriction is not enforced when the recording-restriction detecting unit detects that the recording request is improper for the removable medium. In the above case in which a request for recording on a memory card is entered during playback of a CD, when it is detected that the restriction on recording is imposed on a memory card loaded later, for example, recording on the memory card is forbidden or the memory card has no free space, the output state is switched to the playback of the memory card at the time of loading of the memory card, as in the normal operation. In this way, the user can be informed that the loaded memory card is unsuitable for the recording request, by the operational state of the player.

Preferably, the player further includes a memory for storing a source selected at the time when the operation of the player is stopped, and the output-source selecting unit selects the source stored in the memory when the player is started again. In this case, when the player is restarted, the source that was being used when the previous operation of the player was stopped can be automatically placed into an output state, that is, the source the user frequently uses can be automatically selected.

Preferably, the memory also stores an output stop position at which the output from the selected source is stopped, and the output-source selecting unit selects the source stored in the memory when the player is started, and an output operation is started from the output stop position. Consequently, it is possible to automatically select the source the user frequently uses and to start an output operation of the source from the previous output state.

Preferably, the player further includes a plurality of recordable sources, including a source using the removable medium, a recording-source selecting unit for selecting one of the recordable sources, and a memory for storing data as to which recordable source is to be selected when the recording request is entered. The recordable-source selecting unit selects the recordable source stored in the memory when a selection request is not entered. In a case in which the player includes, for example, a recordable source for a memory card and a recordable source for an MD, when information indicating that the memory card is stored as a normal recordable source, recording on the memory card is immediately started in response to a recording request from the user unless the user enters a request for recording on the MD.

Preferably, the medium-loading detecting unit detects a recordable source in which a removable medium is loaded, and the output-source selecting unit selects the detected recordable source. For example, in the above case in which the player includes, for example, a recordable source for a memory card and a recordable source for an MD, when a memory card is not loaded, but an MD is loaded in the recordable source at the time when a recording request is entered from the user, recording on the actually loaded MD can be immediately started. This increases the usability of the player.

Preferably, the player further includes a user-prompt output unit for generating an operational prompt to the user. When the medium-loading detecting unit detects that the removable medium is not loaded at the time when the request for recording on the removable medium is entered, a prompt for loading of the medium is generated. For example, the user can immediately recognize that a desired medium is not loaded, and can easily load the medium within a predetermined time.

Preferably, the operational prompt is generated within a predetermined period. In this case, for example, a beep indicating that a desired medium is not loaded is not sounded for a long period, and therefore, the user is not troubled by such a sound.

Further objects, features, and advantages of the present invention will become apparent from the following description of the preferred embodiments with reference to the attached drawings.

DESCRIPTION OF THE PREFERRED EMBODIMENTS

Embodiments of the present invention will be described below with reference to the attached drawings.

Figure 1:
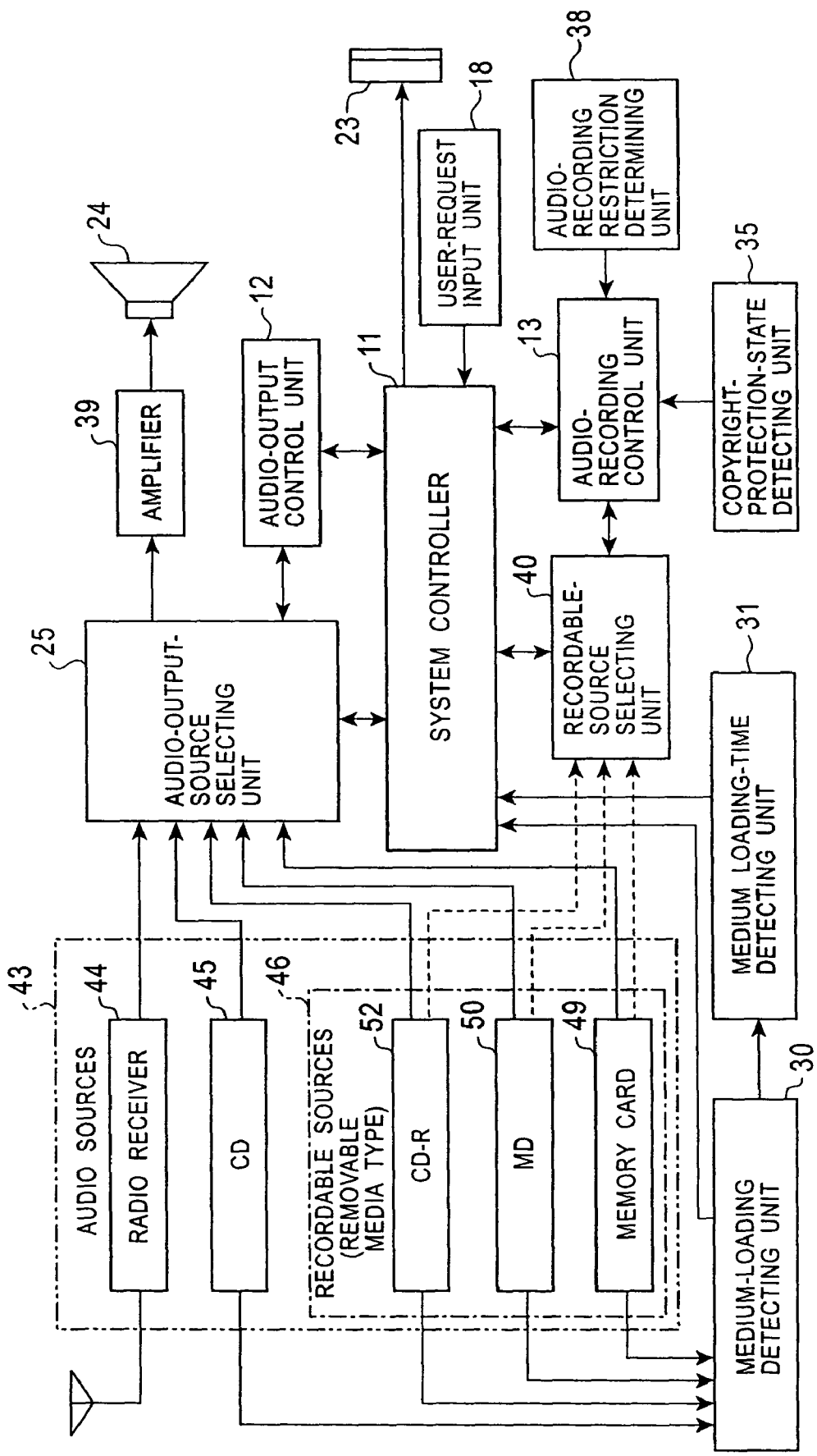
FIG. 1 is a functional block diagram showing the general functional configuration of an audio player according to a first embodiment of the present invention.
Figure 2:
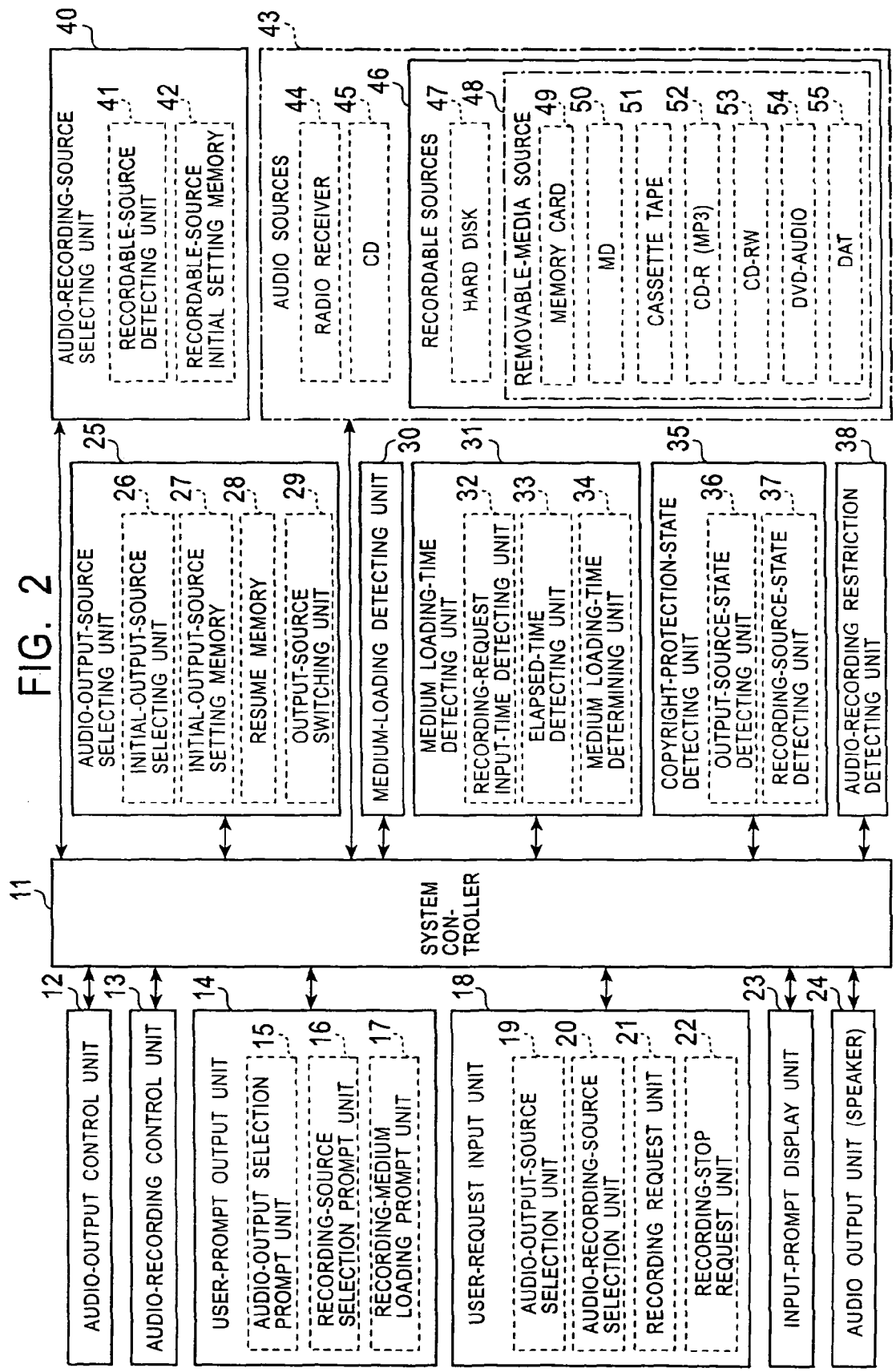
FIG. 2 is a functional block diagram showing the detailed functional configuration of the audio player.

FIG. 1 is a functional block diagram of an audio player according to a first embodiment of the present invention, and FIG. 2 is a detailed block diagram of the audio player. FIG. 1 shows prime functions in FIG. 2 in correlation with one another. Therefore, FIG. 1 shows some of the functional units shown in FIG. 2.

An audio player shown in FIG. 1 includes audio sources 43 serving as audio output apparatuses. The audio sources 43 include a radio receiver 44 that receives broadcasts, such as an AM broadcast, an FM broadcast, and various digital broadcasts, a CD player 45, and recordable sources 46 in which a medium is removably loaded. The recordable sources 46 include a CD-R player 52 for playing back a CD-R on which audio data, such as MP3, is recorded, an MD player 50, and a memory card player 49 that reads audio data, such as MP3 audio data, recorded in a memory chip disposed inside a memory card and that also can record data as necessary.

Of the audio sources 43, the CD player 45, the CD-R player 52, the MD player 50, and the memory card player 49 are removable-media sources in which a medium is removably loaded, and use CD-Rs, MDs, and memory cards as recording sources. Therefore, an audio-output control unit 12 controlled by a system controller 11 exerts control so that an audio-output-source selecting unit 25 selects one of the audio sources 43 and produces sound from audio data via a speaker 24 through an amplifier 39.

The audio-output-source selecting unit 25 can select an arbitrary audio source in response to the user's request from a user-request input unit 18 that is made by operating, for example, various input keys provided on the audio player or input keys provided on a remote control. Furthermore, in principle, the audio-output-source selecting unit 25 immediately selects an audio source that can handle a specific medium when a signal indicating that the medium is loaded in the audio player is generated from a medium-loading detecting unit 30 through the system controller 11.

For example, when the user's request to select a recording source is received by the user-request input unit 18, an audio-recording control unit 13 controlled by the system controller 11 directs an audio-recordable-source selecting unit 40 to produce a signal for commanding that recording on one recording source designated from the recordable sources, namely, a CD-R, an MD, and a memory card, should be performed. This allows audio data output from the audio-output-source selecting unit 25 to be recorded on a desired recording source. However, for example, when an MD is being played back, an audio-recording restriction detecting unit 38 detects the playback operation, and prohibits recording on the MD, that is, prohibits recording on an audio source that is being played back.

When a recording request signal is entered by the user through the user-request input unit 18, it is output to the audio-output-source selecting unit 25 through the system controller 11, and a recording standby state is brought about. In a state in which the medium-loading detecting unit 30 generates a signal indicating that a medium is not loaded in the recording source selected by the user, when a signal indicating that a predetermined medium has been loaded is produced from the medium-loading detecting unit 30 before a medium-loading-time detecting unit 31 generates a signal indicating that a predetermined time has elapsed, switching to the output from a source that handles the loaded medium is not performed, regardless of the above-described basic operation in selecting the audio output source.

The audio player of the first embodiment also includes a copyright-protection-state detecting unit 35. For example, when a memory card is selected as a removable and recordable medium, and various recording conditions are recorded on the memory card in conformity with the copyright protection rules, the copyright-protection-state detecting unit 35 detects the conditions. In a case in which recording on a loaded medium is forbidden by the copyright protection conditions, for example, a message indicating the forbiddance is displayed for the user on a display screen of the audio player. In the audio-output-source selecting unit 25, audio data recorded on the memory card is played back and output immediately after the memory card is loaded, without exerting control so that the audio output source is not switched, regardless of the medium loading under the above-described predetermined conditions. This operation informs the user that a different source is placed in an output state, in spite of the recording request, and that the recording is impossible.

An audio-recording restriction detecting unit 38 detects recording restrictions on the apparatus that is currently performing playback and output operation, write protection states of recordable media, and recording capacity, and provides reference data for recording control and selection of recording sources. While various prompts for the user can be displayed on a display screen 23, when the audio player is disposed near a navigation system, the prompts may be displayed on a monitor screen of the navigation system.

The functional units shown in FIG. 1 as the functional block diagram are shown in more detail in FIG. 2. In FIG. 2, the functional units are connected to the system controller 11 and are controlled in correlation with one another. Referring to FIG. 2, the audio player includes the audio-output control unit 12 and the audio-recording control unit 13. The audio-output control unit 12 generally controls functional units for producing audio output, which will be described later, and selects a desired source. The audio-recording control unit 13 generally controls functional units for recording, which will be described later, so that a desired recording operation can be performed.

A user-prompt output unit 14 allows the user to give accurate directions while viewing the display on an input-prompt display unit 23 such as a display screen of the audio player. The user-prompt output unit 14 includes various prompt units, namely, an audio-output selection prompt unit 15, a recording-source selection prompt unit 16, and a recording-medium loading prompt unit 17. The audio-output selection prompt unit 15 allows arbitrary selection of audio sources. The recording-source selection prompt unit 16 prompts the user to select a desired recordable source from various recordable sources. The recording-medium loading prompt unit 17 prompts the user to load a removable medium selected for recording when the medium is not yet loaded.

The user-request input unit 18 includes request input units, namely, an audio-output-apparatus selection request unit 19 for arbitrarily selecting an audio output apparatus, a recording-source selection request unit 20 for designating a source on which recording is to be performed, a recording request unit 21 that orders recording to be started, and a recording-stop request unit 22 that orders recording to be stopped. Other functional units that allow the user to give various instructions may be provided as necessary. The input-prompt display unit 23 displays a prompt screen generated by the user-prompt output unit 14 so that the user can easily select and request an input.

The audio-output-source selecting unit 25 selects an arbitrary source from various audio sources, which will be described later, and includes an initial-output-source selecting unit 26. When the audio player is powered on, the initial-output-source selecting unit 26 selects a previously used output source as an initial output source in a case in which the final data position in the previous output operation of the source is recorded in a resume memory 28. When such a resume memory 28 is not provided, when no data is recorded in an initial state of the audio player, in spite of the presence of the resume memory 28, or when the resume memory 28 is cleared, a preset source stored in an initial-output-source setting memory 27 is selected as an initial output source. The audio-output-source selecting unit 25 also includes an output-source switching unit 29. When the medium-loading detecting unit 30, which will be described later, detects that a medium is loaded, the output-source switching unit 29 switches the output source to a removable-media source. In a case in which the medium-loading detecting unit 30 detects that a medium is not loaded at the time when a command to perform audio or visual recording on the medium is entered during the output operation of an arbitrary source, the output-source switching unit 29 does not switch the output source to the removable-media source, even if the medium-loading detecting unit 30 detects the loading of the medium later.

As described above with reference to FIG. 1, the medium-loading detecting unit 30 detects a loading state of a removable medium in a removable-media source. The medium-loading-time detecting unit 31 includes a recording-request input-time detecting unit 32, an elapsed-time detecting unit 33, and a medium loading-time determining unit 34. The recording-request input-time detecting unit 32 detects the time at which an audio recording request is entered. The elapsed-time detecting unit 32 detects the time that has elapsed since the recording request was entered. The medium loading-time determining unit 34 determines whether a medium has been loaded within a predetermined time, for example, three minutes, on the basis of the elapsed time detected by the elapsed-time detecting unit 33. A signal from the medium loading-time determining unit 34 is sent to the audio-output-source selecting unit 25 through the system controller 11 so that it is used to select an audio output source.

The copyright-protection-state detecting unit 35 includes an output-source state detecting unit 36 for detecting the copyright protection state of, for example, a CD that produces or is producing audio output, and a recording-source state detecting unit 37 for detecting the copyright protection state, such as the number of recording operations, of a selected recording source, for example, a memory card.

The audio-recordable-source selecting unit 40 includes a recording-source detecting unit 41 for selecting a recordable source from various audio sources in the player, which will be described later, and a recording-source initial setting memory 42 for storing a predetermined recording source that is selected when the user does not designate any recording source.

The audio sources 43 that can be used in the audio player include various presently available audio sources. Audio sources that do not perform recording include, for example, the radio receiver 44 that receives broadcasts, such as an AM broadcast, an FM broadcast, and various digital broadcasts, and the CD player 45. Audio sources 46 that are capable of recording include a built-in hard disk 47 that cannot be removed. Removable-media sources 48 include a memory card player 49 that reads audio data, such as MP3 data, recorded in a built-in memory chip of a memory card, and that produces the data for recording. The hard disk may be provided in the form of a removable card.

The removable-media sources 48 also include an MD player 50 that plays back MDs including MDLPs and that performs recording thereon, a cassette tape player 51 for performing analog playback and recording, a CD-R player 52 that plays back CD-Rs in which audio data, such as MP3 data, is recorded, and that records audio data only once, a CD-RW player 53 that can similarly perform recording a plurality of times, a DVD-audio player 54 that plays back DVD-audios in which data is recorded in a predetermined format and that can perform recording depending on its function, and a DAT player 55 that can record digital data on a cassette tape and that can play back the data.

The above sources are just examples. For example, various audio sources, such as audio recording sources using a blue laser or using nanotechnology, are expected to become available in the future. Of course, those audio sources can be appropriately used. The CD-R player 52 and the CD-RW player 53 may be combined into a single DVD player.

Figure 3:
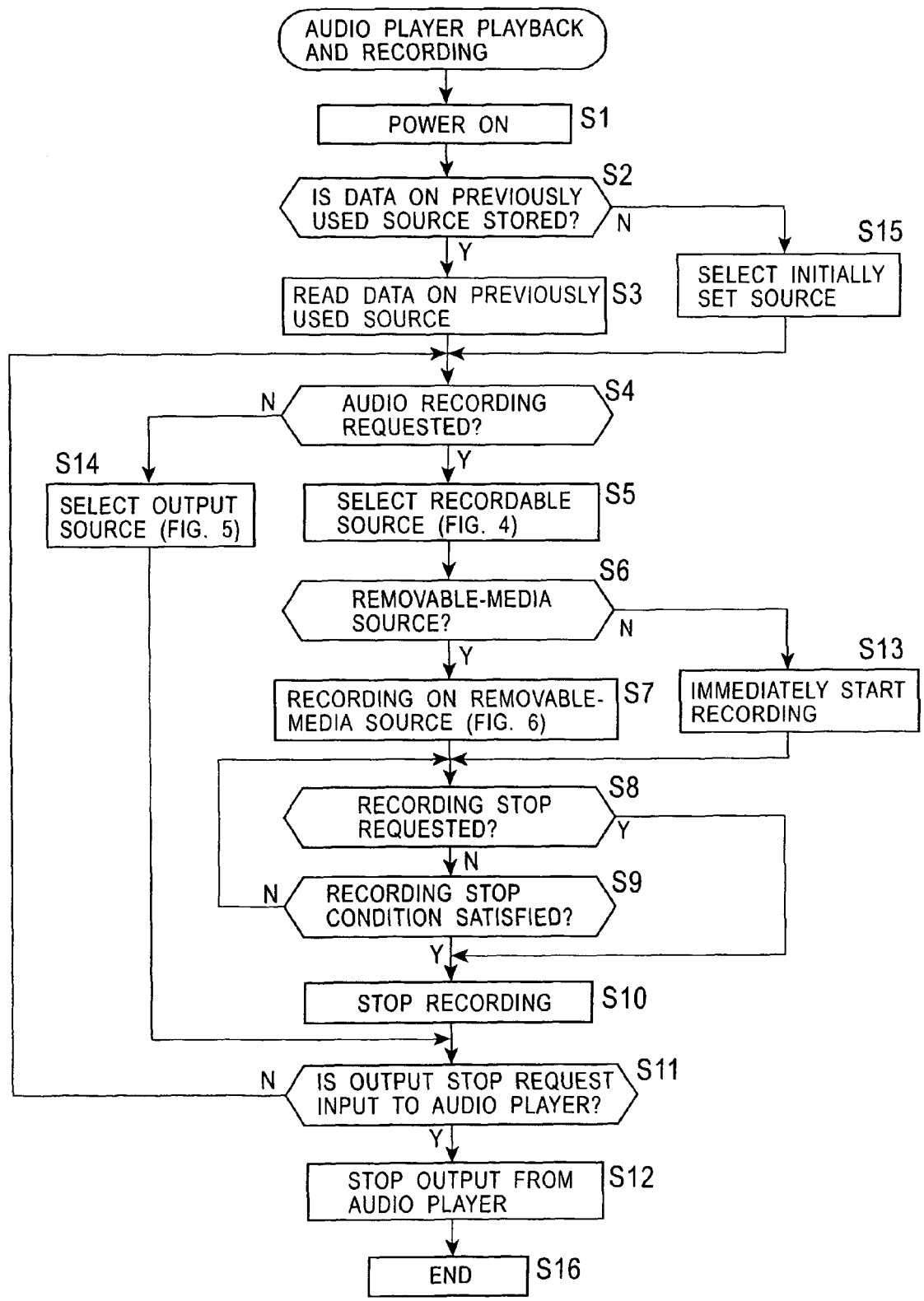
FIG. 3 is a flowchart showing the basic operational procedure for playback and recording in the audio player.

The audio player having a configuration defined by the above functional block can sequentially operate, for example, according to a flowchart shown in FIG. 3, which shows the flow of the basic operation. The basic operation of the audio player will be described below with reference to FIGS. 1 and 2 as the functional block diagrams and FIG. 3, and FIGS. 4 to 6 showing the processes involved in the operational flow in more detail.

In a playback and recording procedure shown in FIG. 3, the audio player is first powered on (Step S1), and it is immediately determined whether information about a previously used source is stored (Step S2). In order to make this determination, the initial-output-source selecting unit 26 of the audio-output-source selecting unit 25 shown in FIG. 2 detects whether information about an audio source which was being used at the time the player was stopped in the previous use is stored in the resume memory 28.

When it is determined in Step S2 that information about the previously used source is stored in the resume memory 28, the source is selected and is brought into an output state (Step S3). When it is determined that information about the previously used source is not stored, an initially set source is selected and is brought into an output state (Step S15). The initially set source stored in the initial-output-source setting memory 27 is read out by the initial-output-source selecting unit 26.

After the power is turned on, audio output is produced by the selected source by the above processes, and it is then determined whether a recording request is entered (Step S4). When it is determined that a recording request is not entered, an output-source selecting operation shown in FIG. 5, which will be described later, is performed, and it is determined whether an output stop request is received by the audio player (Step S11). When an output stop request is not entered, it is determined again whether a recording request is entered, and these operations are repeated until a recording request is entered. When a request to stop the output of the audio player is entered, the output is stopped (Step S12), and the operational procedure is completed (Step S16). Therefore, this operational procedure is a basic operational procedure for the basic operation performed when a recording request is not received by the audio player.

Figure 4:
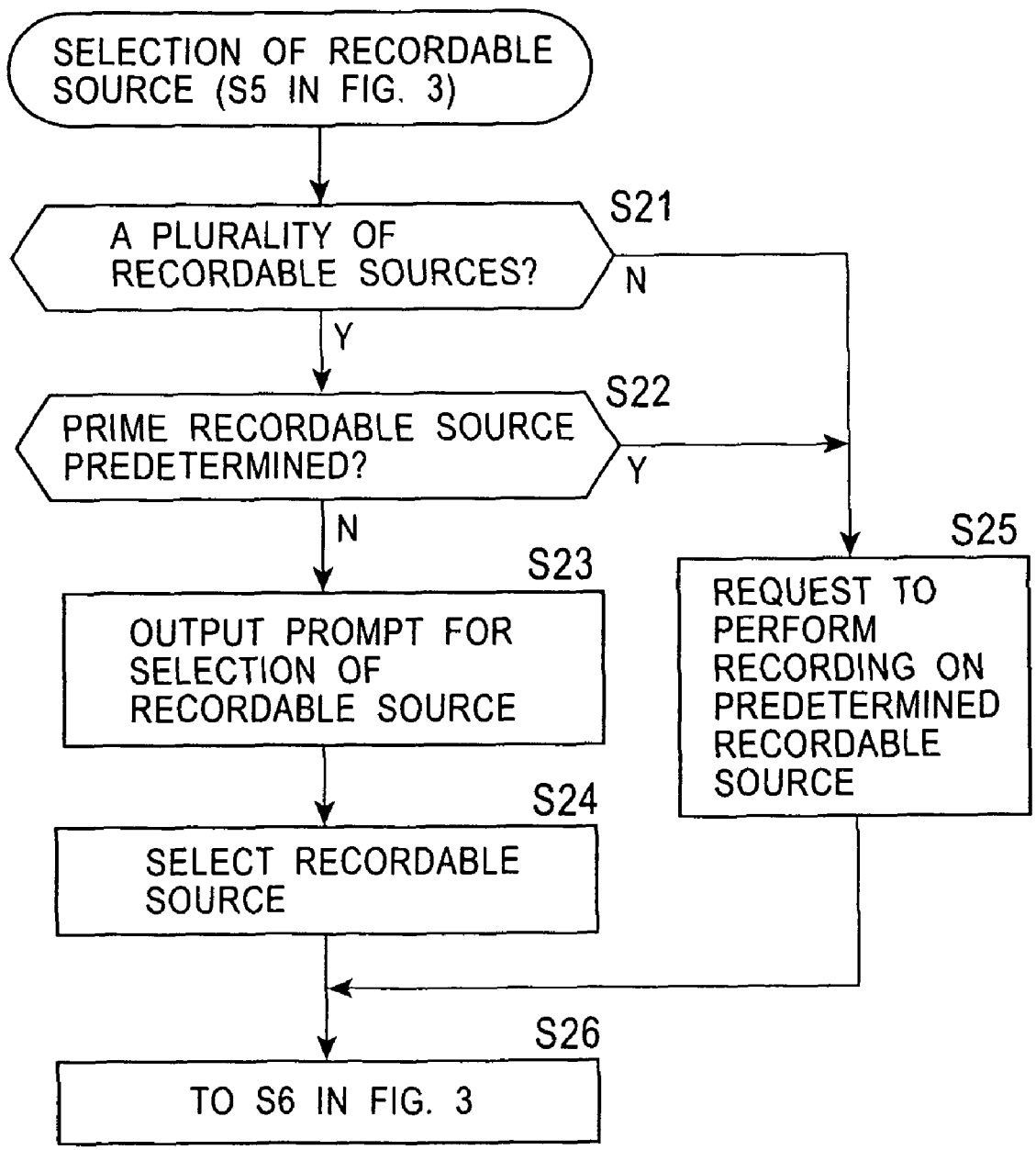
FIG. 4 is a flowchart showing a process for selecting a recordable source in the basic operational procedure.

When it is determined in Step S4 that a recording request is entered, a process to be described later for selecting a recordable source is performed, as shown in FIG. 4 (Step S5). After a recordable source is properly selected in Step S5, it is determined whether the selected recordable source is of a removable media type (Step S6). In order to make this determination, data as to whether audio sources used in the audio player are of a removable media type is stored in the memory beforehand, and it is determined, on the basis of the data, whether the selected recordable source is of a removable media type after the source has been selected, as described above.

Figure 6:
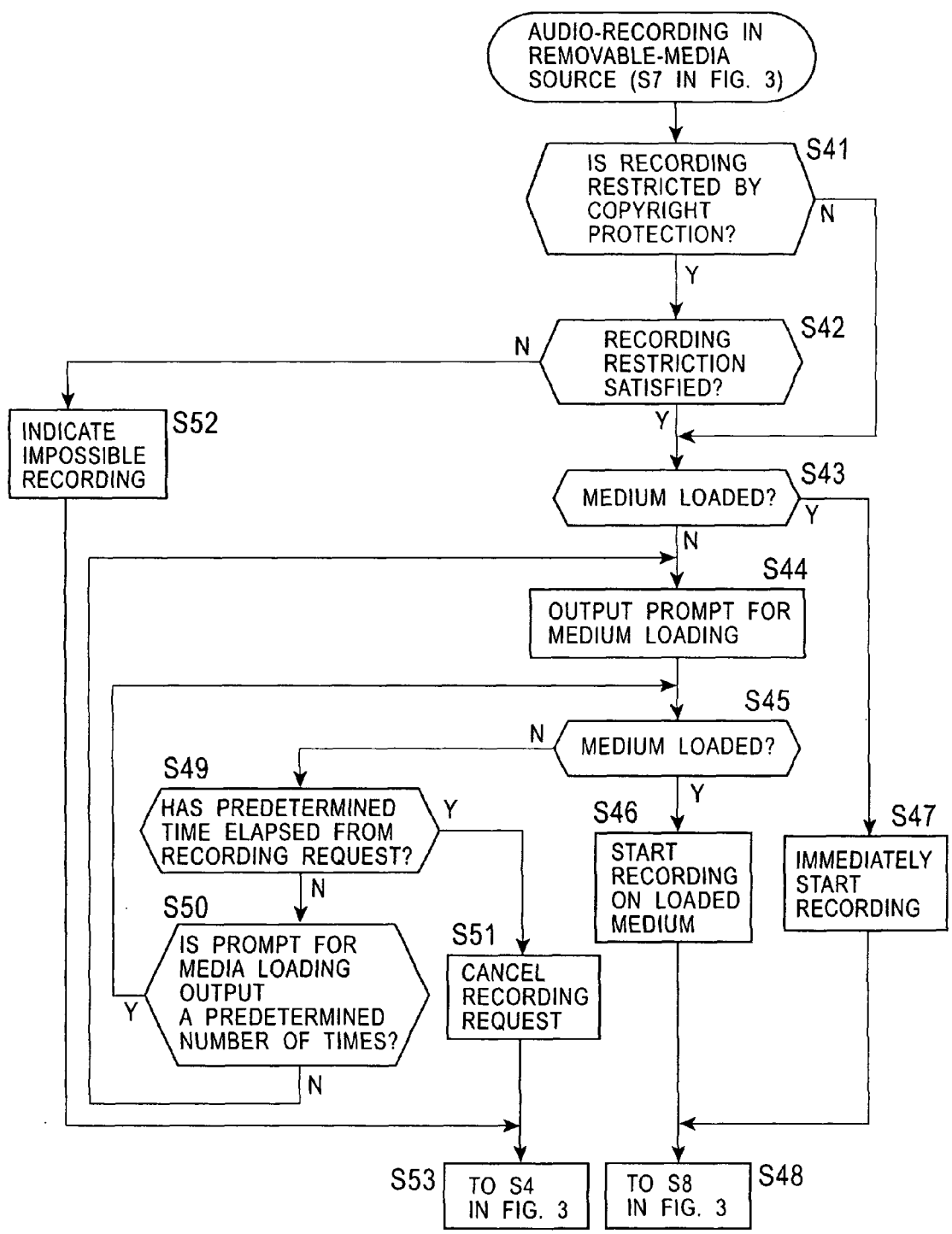
FIG. 6 is a flowchart showing a process for recording on a removable-media source in the basic operational procedure.

When it is determined in Step S6 that the selected recordable source is of a removable media type, a process to be described later for recording on the source is performed, as shown in FIG. 6. This process will be described in detail later. When it is determined in Step S6 that the recordable source is not of a removable media type, for example, when recording on the built-in hard disk is selected, recording on the hard disk is immediately started (Step S13). Although not shown, when a selected source for output is a source for a copyguarded CD, recording may be forbidden, regardless of the type of recording source, because the recording corresponds to recording restricted by copyright protection.

After the recording operation in Step S7 or Step S13 is performed, it is determined whether a recording stop request is entered (Step S8). When it is determined that a recording stop request is not yet entered by the user, it is then determined whether a recording stop condition is satisfied, for example, whether there is no data recording area in the recording medium (Step S9). When it is determined that the recording stop condition is not satisfied, it is determined again in Step S8 whether a recording stop request is entered. Subsequently, these operations are repeated until any stop condition is satisfied.

When it is determined in Step S8 that a recording stop request is entered or when it is determined in Step S9 that the recording stop condition is satisfied, the recording operation is stopped in Step S10. In this case, the output source that has been recording still remains in an output state. In a manner similar to that after the process in Step S14, it is determined whether a request to stop the audio player is entered (Step S11). When a stop request is not yet entered, Step S4 and subsequent steps are repeated. When a stop request is entered, the output of the audio player is stopped (Step S12), and the operational procedure is completed (Step S16).

FIG. 4 is a detailed flowchart showing the above process for selecting a recordable source in Step S5 in FIG. 3. As shown in FIG. 4, it is first determined whether there are a plurality of recordable sources (Step S21). When a plurality of recordable sources are provided, as shown in FIGS. 1 and 2, it is determined whether the prime source is predetermined (Step S22). In order to make this determination, it is determined whether the recordable-source initial setting memory 42 in the audio-recordable-source selecting unit 40 shown in FIG. 2 stores data on an initially set recording source. When it is determined that no source is pre-selected, a prompt for selecting a recordable source is generated (Step S23), that is, the prompt is displayed on the input-prompt display unit 23 by the recording-source selection prompt unit 16 in the user-prompt output unit 14 in FIG. 2.

Subsequently, the user selects a recordable source through the recording-source selection request unit 20 in the user-request input unit 18 (Step S24). When it is determined in Step S21 that there is only one recordable source, or when it is determined in Step S22 that the prime source of a plurality of recordable sources is pre-selected, recording on the single recordable source or the pre-selected recordable source is requested (Step S25), and Step S26, that is, Step S6 in FIG. 3 is performed in a manner similar to that after Step S24 described above.

Figure 5:
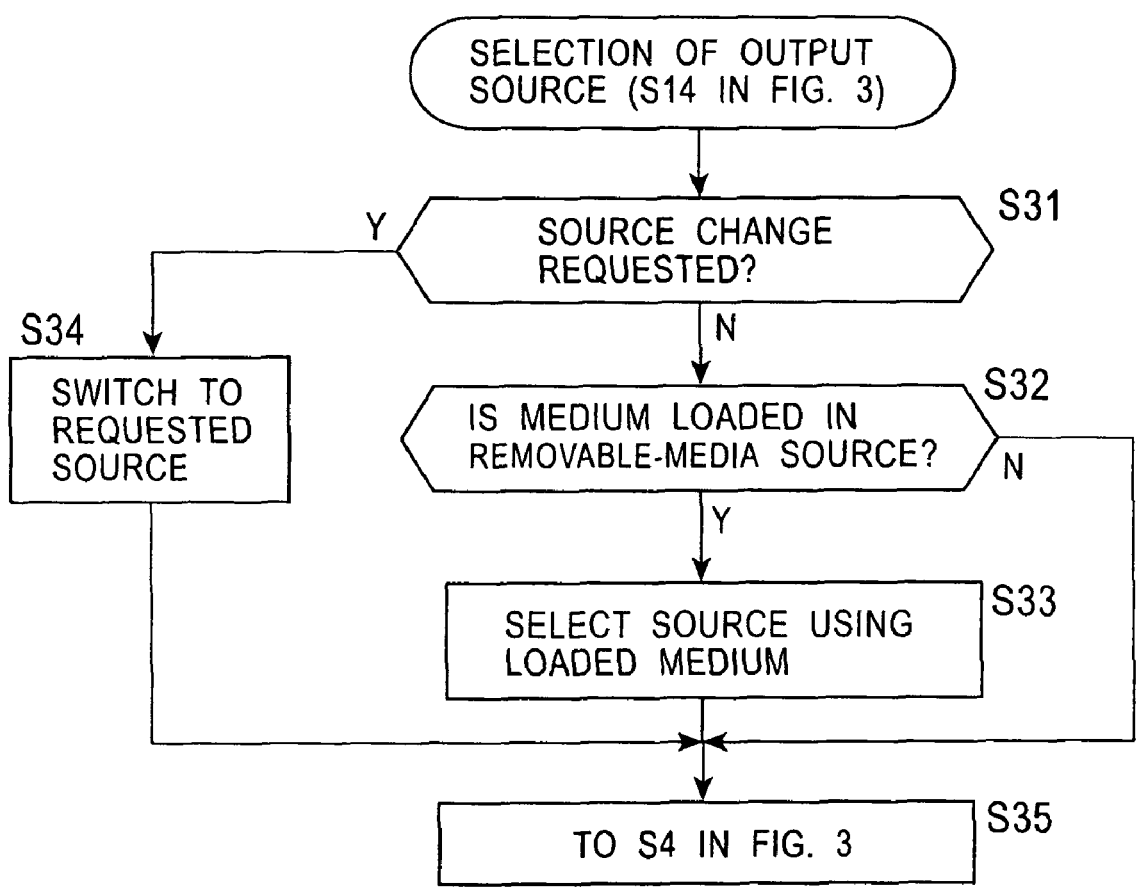
FIG. 5 is a flowchart showing a process for selecting an output source in the basic operational procedure.

In the process for selecting an output source in Step S14 in FIG. 3, it is first determined whether a source change request is entered, as shown in FIG. 5 (Step S31). When it is determined that a source change request is not entered, it is determined whether a medium is loaded (Step S32). When a medium is loaded, a source that uses the loaded medium is selected (Step S33). In such a case in which at least a recording request is not entered to the audio player, a source that uses a loaded medium is selected immediately after the medium is loaded.

When it is determined in Step S31 that a source change request is entered, the source is switched according to the request in Step S34. When it is determined in Step S32 that a medium is not loaded in the removable-media source, Step S1 in FIG. 3 is performed again and the basic output operation of the player is continued, in a manner similar to that after the selection is performed in Step S33 and after the source is switched in Step S34.

In the process for performing recording in the removable-media source in Step S7 in FIG. 3, for example, it is first determined whether the recording is restricted by copyright protection, as shown in FIG. 6 (Step S41). That is, in a case in which the source is copyguarded, or in a case in which, for example, at most three copies of data are permitted in the recordable and removable-media source, such as a memory card player, and four or more copies are permitted only when previously copied data is returned to the original source by the copyright protection rule, it is detected that the copyright is protected.

When it is determined that the current recording is restricted by copyright protection, it is determined whether the recording satisfies the recording conditions (Step S42). The determination can be made by detecting the original source and a source in which data is stored, in the copyright-protection-state detecting unit 35 in FIG. 2. When it is determined in Step S42 that the next recording operation satisfies the copyright protection conditions, and when it is determined in Step S41 that the recording is not restricted by copyright protection, it is then determined whether a medium is loaded (Step S43). When it is determined that a medium is not yet loaded, a prompt for loading of a medium is generated (Step S44). This operation is performed by the recording-medium loading prompt unit 17 in the user-prompt output unit 14 in FIG. 2.

Subsequently, it is determined whether a medium is loaded (Step S45). When it is determined that a medium is not loaded, it is determined whether a predetermined time, for example, three minutes, has elapsed since the recording request was input (Step S49). When it is determined that the predetermined time has not yet elapsed, it is determined whether a prompt for medium loading has been generated a predetermined number of times or more (Step S50). When it is determined that the prompt has not been generated a predetermined number of times or more, a prompt for loading is generated again in Step S44, and it is determined again whether a medium has been loaded (Step S45).

When it is determined in Step S50 that the prompt has been generated a predetermined number of times or more while the above operations are repeated, it is determined whether a medium has been loaded in Step S45 without generating a prompt for medium loading. This is because further prompts may trouble the user. When it is determined in Step S49 that the predetermined time has elapsed since the recording request was entered, the recording request is cancelled (Step S51), it is determined again in Step S4 in FIG. 3 (Step S53) whether a new recording request is entered input, while continuing the current audio output, and the above operations are repeated.

In a state in which it is determined in Step S49 that the predetermined time has not elapsed, when it is determined in Step S45 that a medium is loaded, recording on the loaded medium is immediately started without changing the output source (Step S46). In this case, an actual recording operation may be started when the user enters an operation start or recording start request again. In this case, the user recognizes that the previous recording request is improper, by the operational state of the player. After that, it is determined in Step S8 in FIG. 3 (Step S48) whether a recording stop request is entered, and the above-described operations are then performed.

In the audio player, when a medium is loaded in a removable-media source in a state in which at least a recording request is not entered, a source that uses the loaded medium is immediately selected, and an output operation is performed. However, when it is determined that a predetermined recording medium is loaded before a predetermined time has elapsed since a recording request was entered, recording on the loaded medium is started without switching the output source.

For this reason, in the player which switches the output source to a removable-media source when a medium is loaded in the removable-media source in a state in which the player is placed in an output state for a specific source, in a case in which a medium is not loaded when a recording request is entered in a state in which the player is placed in the output state for the specific source, recording on the medium is started on loading the medium, without switching the output source to an output source for the medium.

When it is determined in Step S42 that the current recording does not satisfy the recording restrictions, such as output is produced to indicate that recording is impossible, for example, by a screen display, chimes, or a warning buzzer (Step S52). Then, in a manner similar to that after Step S51, the above-described operations for continuing the output of the source are repeated while waiting for the next recording request to be entered.

When it is determined in Step S43 that a medium has already been loaded, recording is immediately started (Step S47), and it is determined in Step S8 in FIG. 3 whether a recording stop request is entered, in a manner similar to that when recording on the loaded medium is started in Step S46. Subsequently, similar operations are repeated to continue or stop the recording.

Figure 7:
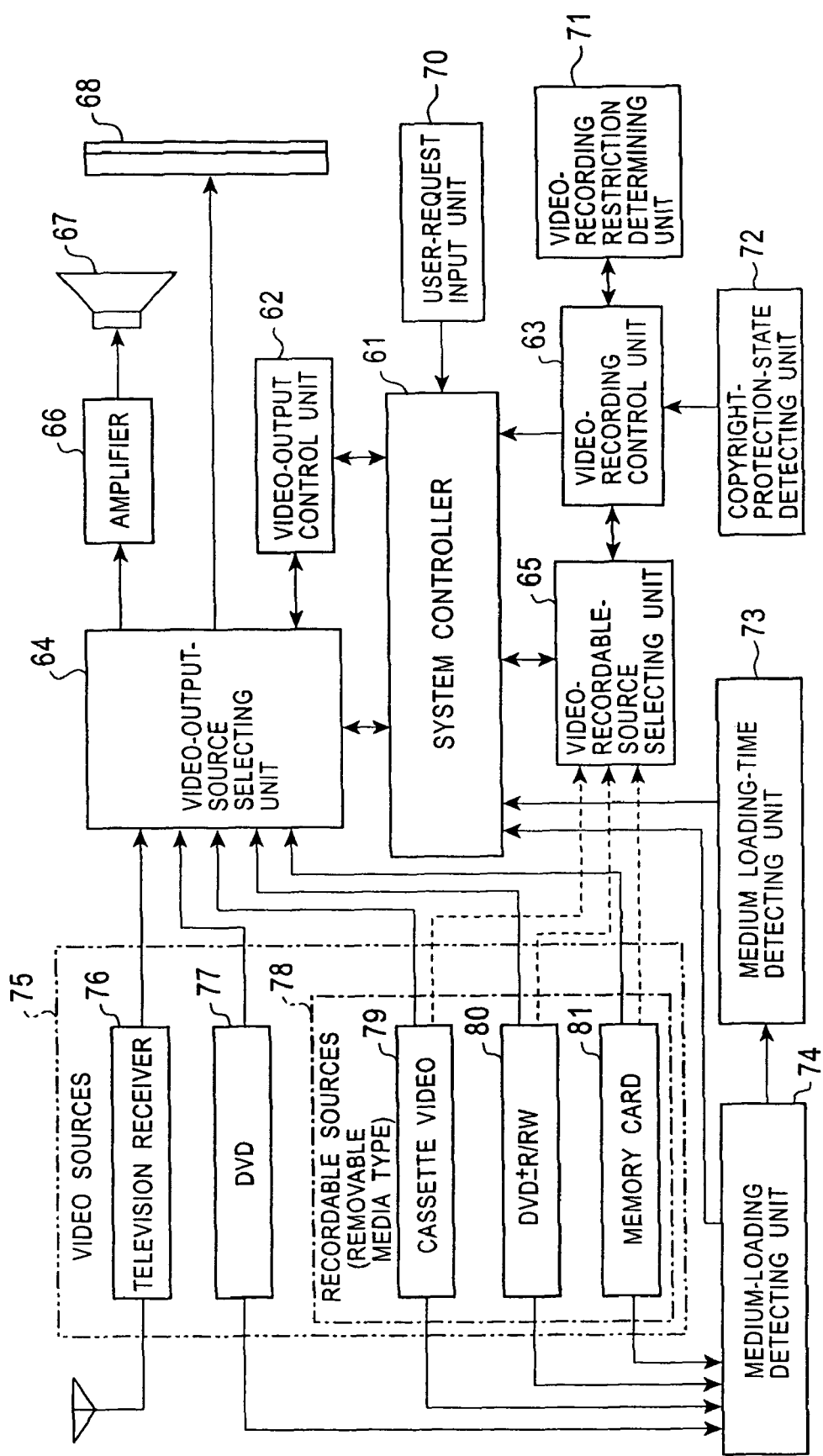
FIG. 7 is a functional block diagram showing the general functional configuration of a video player according to a second embodiment of the present invention.

While the present invention is applied to the audio player in the above embodiment, it is also applicable to a video player that displays pictures on a monitor screen. FIG. 7 is a functional block diagram of the video player corresponding to the functional block diagram shown in FIG. 1.

The video player shown in FIG. 7 includes video sources 75. The video sources 75 include a television receiver 76 and a DVD player 77 serving as sources incapable of video recording, and sources 78 which are capable of video recording and in which a medium can be removably loaded. The sources 78 include a cassette video player 79, a DVD±R and DVD-RW player 80 that reads and writes data from and to a DVD disk, and a memory card player 81 that has recently increased in capacity and that records video images, for example, by MPEG.

A video output controller 62 and a video recording controller 63 are connected to a system controller 61 so that video output and recording can be totally controlled. A video-output-source selecting unit 64 corresponds to the audio-output-source selecting unit 25 shown in FIG. 1, and a video-recordable-source selecting unit 65 corresponds to the audio-recordable-source selecting unit 40 shown in FIG. 1. Of course, video images selected by the video-output-source selecting unit 64 include accompanying sounds. Therefore, video image output from the source are displayed on a display screen 68, and sounds relating to the video images are produced by a speaker 67 via an amplifier 66.

Like the audio player shown in FIG. 1, the video player also includes a user-request input unit 70, a video-recording restriction determining unit 71, a copyright-protection-state detecting unit 72, a medium-loading-time detecting unit 73, and a medium-loading detecting unit 74. Since these units perform operations similar to those in the above first embodiment shown in FIG. 1, descriptions thereof are omitted.

Figure 8:
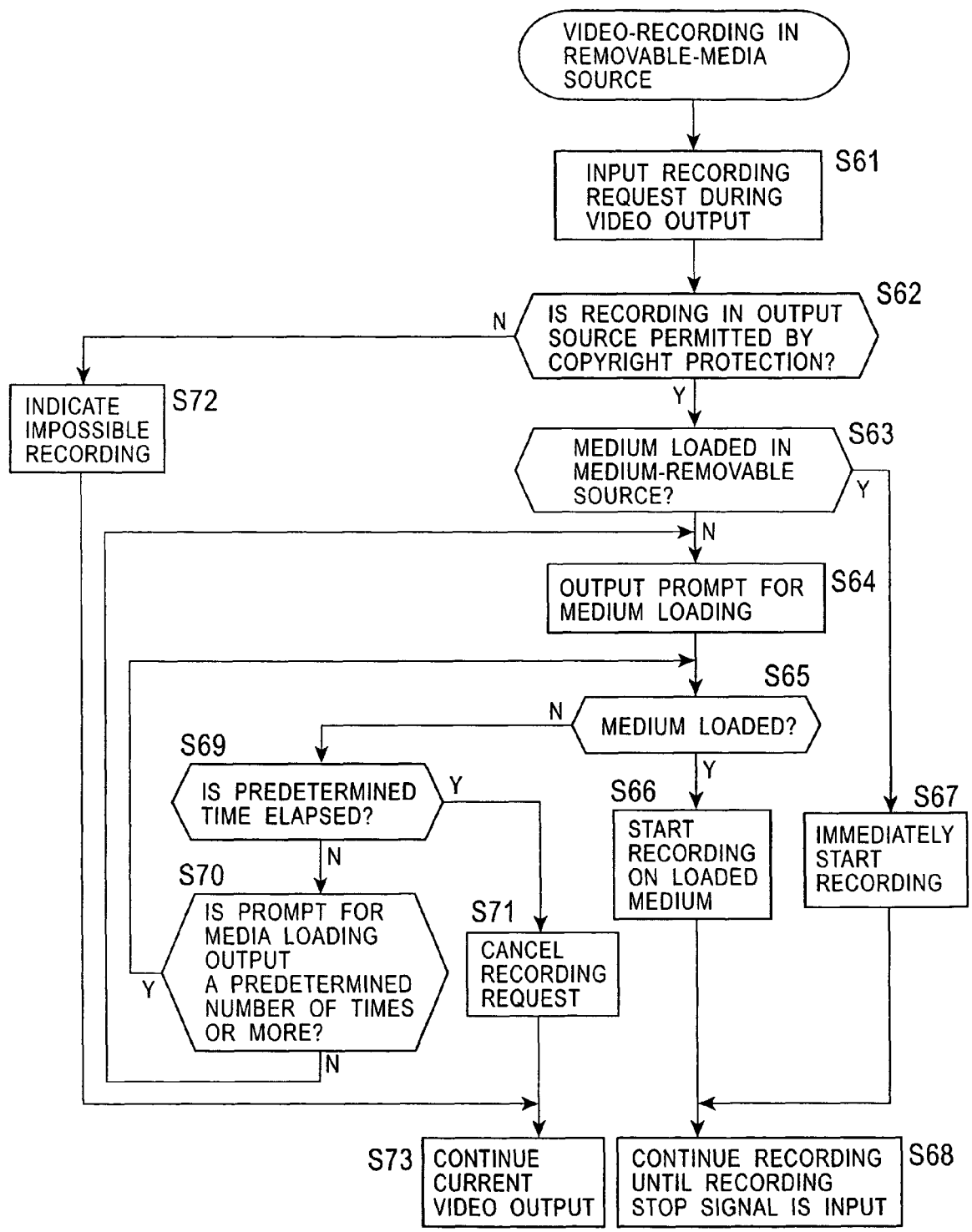
FIG. 8 is a flowchart showing a process for video recording in a removable-media source in the video player.

The video player having the configuration defined by such a functional block can sequentially perform operations similar to those in the audio player shown in FIG. 6 according to a flowchart shown in FIG. 8. Video recording operation in a removable-media source is performed in a manner similar to that in the flowchart shown in FIG. 6. After a video recording request is entered during video output in Step S61, it is determined whether the source that is producing video output is not forbidden to perform recording by copyright protection (Step S62). For example, when a commercially available copy-guarded DVD is being selectively played back, or when a memory card player serving as a recording medium is restricted by copyright protection, in a manner similar to the above and recording is forbidden by the restriction, it is determined that the source is restricted by copyright protection, and output is produced to indicate that recording is impossible, for example, by a screen display, chimes, or a warning buzzer (Step S72), and the current video output is continued (Step S73).

When it is determined in Step S62 that the output source is not restricted by copyright protection or that the copyright protection conditions are satisfied even when a recording medium, such as a memory card, is protected by copyright, it is determined whether a medium is loaded in the removable-media source (Step S63). When it is determined that the medium is loaded, recording is immediately started (Step S67), and is continued until a recording stop signal is entered (Step S68).

When it is determined in Step S63 that a medium is not loaded, a prompt for medium loading is output, as in the above-described audio player (Step S64), and it is then determined whether a medium is loaded (Step S65). When it is determined that a medium is not yet loaded, it is determined whether a predetermined time, for example, three minutes, has elapsed since the recording request was entered (Step S69). When it is determined that the predetermined time has not yet elapsed, it is determined whether a prompt for medium loading has been generated a plurality of times or more (Step S70). When it is determined that the prompt has been not generated a plurality of times or more, a prompt for medium loading is generated again in Step S64, and subsequent operations are repeated similarly.

When it is determined in Step S70 that the prompt for medium loading has been generated a plurality of times or more, Step S65 is performed. Subsequently, the prompt for medium loading is not generated, it is determined whether a medium is loaded, and operations similar to the above are repeated. When it is determined in Step S69 that the predetermined time has elapsed from the receipt of the recording start request, the recording start request is cancelled (Step S71), and the current video output is continued in Step S73.

When it is determined in Step S65 that a medium is loaded, recording on the loaded medium is started (Step S66), and is continued until a recording stop signal is entered in Step S68. Although not shown, when the amount of recorded data exceeds the recording capacity of, for example, a DVD±R or a DVD-RW, the excess is detected by the video-recording restriction determining unit 71, and the recording is stopped.

In the video player, in a case in which at least a recording request is not entered, when a medium is loaded in a removable-media source, a source that uses the loaded medium is immediately selected, and the medium is played back, as described above. However, when it is determined that a predetermined recordable medium is loaded before a predetermined time elapses since a recording request is entered, recording on the loaded medium is started without switching the output source.

For this reason, in the player that automatically switches an output source to a removable-media source when a medium is loaded in the removable-media source in a state in which the player is in an output state for a specific source, in a case in which a medium is not loaded at the time when audio or visual recording by means of the removable-media source is requested in a state in which the player is in the output state for the specific source, audio or visual recording on the medium can be started immediately after loading of the medium without switching the player to an output state for the medium.

While one player has a plurality of sources and output is performed by arbitrarily switching among the sources in the present invention, the "player" does not always need to include a plurality of sources together in a single body as long as the sources can be controlled by a single controller. For example, in a case in which various sources, such as players and changers, are connected to a head unit of a car audio apparatus and are collectively controlled, it can be considered that the sources constitute a single player. Furthermore, for example, in a case in which sources connected by an i.LINK and sources connected by a wireless or wired LAN can be collectively controlled in a home audiovisual apparatus or a personal computer, it can be considered that the sources constitute a single player.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A player comprising:
   a plurality of sources, at least one of the sources being a removable medium on which audio or video content can be recorded, the player being configured to both record audio or video content onto the removable medium and reproduce audio or video content from the same removable medium, the player further being configured to accept manual loading of the removable medium into the player;
   a selecting unit for selecting a current output source from among the plurality of sources, the current output source being the source of audio or video content currently being reproduced by the player;
   a detecting unit for detecting whether the removable medium has been manually loaded into the player by a user; and
   a switching unit configured to, if no recording request has been entered, automatically switch the current output source of audio or video content currently being reproduced by the player to the removable medium when the detecting unit detects that the removable medium has been manually loaded into the player such that audio or video previously recorded on the removable medium is automatically played back by the player,
   wherein, upon a user request to record audio or video information onto the removable medium, the detecting unit determines whether or not the removable medium is already manually loaded in the player, and if the removable medium is already manually loaded, the player is configured to begin recording audio or video content from the current output source of audio or video content currently being reproduced by the player onto the removable medium without further user input;

if the removable medium is not already manually loaded, the player is configured to enter a standby state, the standby state imposing a switching restriction that prevents the player from automatically switching the current output source of audio or video content currently being reproduced by the player to the removable medium when the detecting unit detects that the removable medium has been manually loaded into the player; and if the detecting unit detects that the removable medium is subsequently manually loaded into the player, audio or video content from the current output source currently being reproduced by the player is automatically recorded onto the removable medium without further user input, whereby when the removable medium is manually loaded into the player after the entry of the record request, audio or video content from the current output source currently being reproduced by the player is then recorded onto the removable medium as requested by the user without another manually entered record request.

2. A player according to claim 1, further comprising:
a time detecting unit,
wherein audio or video content from the current output source is only automatically recorded onto the removable medium without further user input when the time detecting unit detects that the removable medium is manually loaded into the player before a predetermined time elapses from the entering of the recording request.

3. A player according to claim 1, further comprising:
a time detecting unit,
wherein the time detecting unit cancels the request when the time detecting unit does not detect the manual loading of the removable medium into the player before a predetermined time elapses from the entering of the recording request.

4. A player according to claim 1, wherein, when the detecting unit detects that the removable medium is not manually loaded when the recording request is entered, the audio or video content being reproduced from the current output source is temporarily stopped until the removable medium is manually loaded.

5. A player according to claim 1, further comprising:
a copyright protection detecting unit for detecting copyright protection of an audio or video recording when the recording request is entered,
wherein when the copyright protection detecting unit detects that audio or video recording is disabled by copyright protection, the current output source of audio or video being reproduced is switched to the removable medium when the removable medium is manually loaded into the player.

6. A player according to claim 5, wherein the copyright protection detecting unit detects copyright protection for a source from which audio or video output is produced and copyright protection for a source that permits recording.

7. A player according to claim 1, further comprising:
a restriction detecting unit for detecting a restriction on audio or video recording on the removable medium,
wherein when the restriction detecting unit detects that the recording request is improper for the removable medium, recording data onto the removable medium is prohibited.

8. A player according to claim 1, further comprising:
a memory for storing a source that is the current output source when the operation of the player is stopped,
wherein the selecting unit selects the source stored in the memory when the player is started again.

9. A player according to claim 8, wherein the memory also stores an output stop position at which the output from the current output source is stopped, and when the player is started again the output is started from the output stop position.

10. A player according to claim 1, further comprising:
a plurality of recordable sources, including a source using the removable medium;
a recordable selecting unit for selecting one of the recordable sources; and
a memory for storing data as to which recordable source is to be selected when the recording request is entered,
wherein the recordable selecting unit selects the recordable source stored in the memory when a selection request is not entered.

11. A player according to claim 1, wherein the detecting unit detects a recordable source in which the removable medium is loaded, and the selecting unit selects the detected recordable source.

12. A player according to claim 1, further comprising:
a prompt unit for generating a prompt to the user,
wherein, when the detecting unit detects that the removable medium is not loaded when the recording request is entered, a prompt for loading the removable medium is generated.

13. A player according to claim 12, wherein the prompt is generated within a predetermined period.

14. A player according to claim 12, wherein the prompt unit displays the prompt on a screen.

15. A source switching method for a recording and playback apparatus comprising a plurality of sources, at least one of the sources being a removable medium on which audio or video content can be recorded, the recording and playback apparatus being configured to both record audio or video content onto the removable medium and reproduce audio or video content from the same removable medium, the method comprising:
selecting a current output source from among the plurality of sources, the current output source being the source of audio or video content currently being reproduced by the recording and playback apparatus;
determining whether a request for audio or video content to be recorded onto the removable medium has been entered by a user; and
detecting whether the removable medium has been manually loaded into the recording and playback apparatus,
wherein, (a) when it is determined that the recording request has not previously been entered by the user, the current output source from which audio or video content is currently being reproduced by the recording and playback apparatus is automatically switched without user input to the removable medium when it is detected that the removable medium is manually loaded into the recording and playback apparatus by a user,
(b) when it is determined that the recording request has been entered by the user and the removable medium has been manually pre-loaded, the recording and playback apparatus records the audio or video content being reproduced from the current output source onto the removable medium;

(c) when it is determined that the recording request has been entered by the user but the removable medium has not been manually pre-loaded, the recording and playback apparatus is placed into a standby state in which the recording and playback apparatus is prevented from automatically switching the current output source from which audio or video content is currently being reproduced by the recording and playback apparatus to the removable medium when it is detected that the removable medium is subsequently manually loaded into the recording and playback apparatus; and (d) when it is determined that the recording request has been previously entered by the user, (1) the current output source from which audio or video content is currently being reproduced by the recording and playback apparatus is not switched to the removable medium and (2) recording of audio or video content from the current output source currently being reproduced by the recording and playback apparatus onto the removable medium is automatically started without another recording request input from the user when it is subsequently detected that the removable medium has been manually loaded into the recording and playback apparatus.

16. A source switching method according to claim 15, wherein the current output source is not switched to the removable media source when it is detected that the removable medium is manually loaded into the recording and playback apparatus before a predetermined time elapses from the time of the recording request.

17. A source switching method according to claim 15, wherein, when the manually loading of the removable medium into the recording and playback apparatus is detected after the recording request is entered, audio or video content from the current output source is automatically started without further input from the user.

18. A source switching method according to claim 15, wherein, when it is detected that the removable medium is not manually loaded when the recording request is entered, the player temporarily stops reproducing the audio or video content from the current output source.

19. A player comprising:

a plurality of sources, at least one of the sources being a removable medium on which audio or video content can be recorded, the player being configured to both record audio or video content onto the removable medium and reproduce audio or video content from the same removable medium, the player further being configured to accept manual loading and permit manual removal of the removable medium;

a selecting unit for selecting a current output source from among the plurality of sources, the current output source being the source of audio or video content currently being reproduced by the player;

a detecting unit for detecting whether the removable medium is manually loaded into the player by a user; and a switching unit for switching the current output source that is the source of audio or video content currently being reproduced by the player, wherein, if a recording request has not been entered by the user to record audio or video content from the current output source currently being reproduced by the player onto the removable medium when the detecting unit detects that the removable medium is manually loaded in the player, the player automatically switches the current output source that is the source of audio or video content currently being reproduced by the player to the removable medium, while if the removable medium is manually pre-loaded when the recording request is entered, the player records the audio and/or video content currently being reproduced from current output source onto the removable medium, and if the removable medium is not manually pre-loaded when the recording request is entered, the switching unit imposes a switching restriction so as not to switch the current output source that is the source of audio or video content currently being reproduced by the player to the removable medium when the detecting unit detects that the removable medium is subsequently manually loaded into the player by a user, and when the detecting unit detects that the removable medium is subsequently manually loaded, audio or video content being reproduced from the current output source is automatically recorded onto the removable medium in accordance with the user's recording request without requiring another recording request to be manually entered.

* * * * *